UNITED STATES PATENT OFFICE.

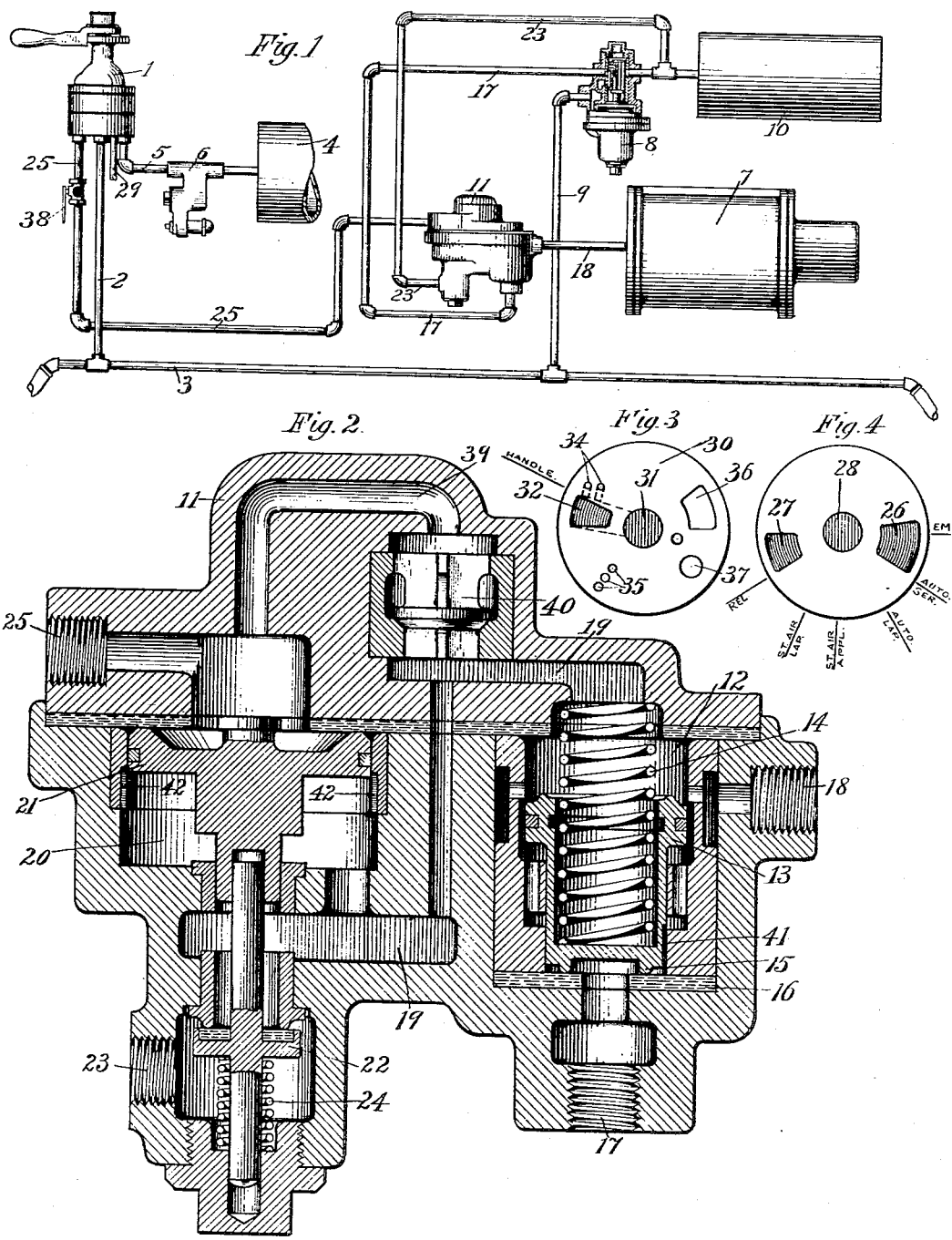

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

COMBINED AUTOMATIC AND STRAIGHT-AIR BRAKE.

1,112,494.     Specification of Letters Patent.     Patented Oct. 6, 1914.

Application filed April 2, 1910. Serial No. 552,978.

*To all whom it may concern:*

Be it known that I, WALTER V. TURNER, a citizen of the United States, residing at Edgewood, in the county of Allegheny and State of Pennsylvania, have invented new and useful Improvements in Combined Automatic and Straight-Air Brakes, of which the following is a specification.

This invention relates to fluid pressure brakes, and more particularly to a combined automatic and straight air brake apparatus.

For single cars, the so-called straight air brake may be employed to advantage, by reason of the simplicity of the apparatus involved and of the readiness with which the brake cylinder pressure may be graded up or down by small amounts and the consequent flexibility of the brake thus made possible. If, however, two or more cars are operated as a train, it is highly desirable to have the cars equipped with an automatic brake both on account of the well known safety features of the automatic brake whereby the brakes are applied upon a break-in-two of the train and because of the superior control of the brakes in service obtainable with the automatic brake over the straight air brake. In various classes of service, notably electric traction service, it is customary to run cars sometimes singly and sometimes in trains of two or more cars according to circumstances and to meet this class of service it has been proposed to employ a combined automatic and straight air brake, whereby the brakes may be controlled either automatically or by straight air.

One object of my invention is to provide an improved automatic and straight air brake apparatus of simple construction adapted to be readily operated either as an automatic or as a straight air brake.

Another object of my invention is to provide an apparatus of the above character having a single brake valve for controlling both the automatic and straight air braking and in which the full pressure carried in the system is available both in automatic and straight air operation.

Another object of my invention is to provide improved means for facilitating the release of the brakes in connection with a combined automatic and straight air brake.

In the accompanying drawing; Figure 1 is a diagrammatic view of a car brake equipment embodying my invention; Fig. 2 a sectional view of a combined automatic and straight air controlling valve mechanism constructed in accordance with my invention; Fig. 3 a face view of the rotary valve of the brake valve employed, showing the relative arrangement of its ports and cavities; and Fig. 4 a plan view of the valve seat for the above rotary valve.

The brake equipment shown in Fig. 1 of the drawing and illustrating one application of my improvement, comprises a brake valve 1, connected by pipe 2 to a train pipe 3, a main reservoir 4 adapted to be maintained charged with fluid under pressure by the usual air compressor or pump and being connected to the rotary valve chamber of the brake valve 1 by a pipe 5 containing a reducing valve 6, a brake cylinder 7, triple valve 8, connected to the train pipe 3 by a branch pipe 9, auxiliary reservoir 10, and a combined automatic and straight air controlling valve mechanism 11.

The valve mechanism 11 is shown in section in Fig. 2 of the drawing and comprises a casing having a piston chamber 12 containing a piston 13, subject on one side to the pressure of a coil spring 14 tending to maintain said piston in a position in which a seat ring 15 on the piston is seated on a valve seat 16. The brake cylinder supply and release pipe 17 of the triple valve 8 is connected to the space within the seated area of the piston 13 and pipe 18 leading to the brake cylinder 7 opens to the piston chamber 12 at a point above the piston 13 when the same is on the seat 16. The piston chamber 12 is also open to a passage 19 which is connected to a second piston chamber 20 containing a movable abutment 21. A valve 22 adapted to be operated by the abutment 21, controls communication from a pipe 23, leading to the auxiliary reservoir 10, to said passage 19, a coil spring 24 being provided to normally maintain the valve 22 seated. The chamber at the opposite side of the movable abutment 21 is connected to a straight air pipe 25 leading to the brake valve 1.

The rotary valve seat of the brake valve 1, as shown in Fig. 4, is provided with a port 26 communicating with pipe 2 leading to the train pipe, a port 27 communicating with straight air pipe 25, and an exhaust port 28 communicating with an exhaust pipe 29. The rotary valve 30, shown in Fig.

3, is provided with a central cavity 31 adapted to register with exhaust port 28, and communicates through a cavity in the valve with a port 32, ports 34 communicating with port 32, through ports 35, and through ports 36 and 37.

The straight air pipe 25 preferably contains a three-way cock 38, adapted in one position to establish communication through the straight air pipe 25 from the brake valve, and in another position to connect the straight air pipe to the atmosphere.

The automatic portion of the brake system may be charged up in the usual way from the train pipe 3, and where the brakes are to be operated automatically, the cock 38 is turned to the position cutting off the straight air pipe from the brake valve and opening the same to the atmosphere, so as to insure that fluid pressure will not accumulate in the straight air pipe. Upon reducing the train pipe pressure to effect an application of the brakes, the triple valve 8 is actuated to supply air from the auxiliary reservoir 10 to the pipe 17 and this fluid pressure acting on the exposed area of the piston 13 at the seat 15 shifts the piston to its upper position, opening communication from the pipe 17 to the brake cylinder pipe 18. Fluid under pressure is thereupon admitted to the brake cylinder. Further reductions in train pipe pressure may be made in the usual manner to increase the brake cylinder pressure, the piston 13 being maintained seated in its upper position by the brake cylinder pressure acting on its under face as opposed to atmospheric pressure on the straight air side of the piston.

The brakes may be released in the usual manner, by increasing the train pipe pressure, the fluid from the brake cylinder flowing back through pipe 17 to the triple valve exhaust. In releasing, however, when the brake cylinder pressure has been reduced to a certain low point, according to the pressure of the spring 14, the piston 13 will be shifted by said spring to its lower position, in which the pipe 17 is cut off form the brake cylinder. This will not interfere with the complete release of the brakes, however, as the remaining air in the brake cylinder will escape through the straight air pipe 25 and the exhaust port of the three-way cock 38.

In order to permit the release of air through the straight air pipe as above described, a by-pass passage 39 connects the passage 19 directly to the straight air pipe 25, a check valve 40 being interposed in said pipe, to prevent flow of air from the straight air pipe 25 to the passage 19.

Only a reduced area of the piston 13 being exposed to pressure from the automatic pipe 17 in the seated position, it will be noted that as soon as said piston lifts from its seat, the full area of the piston is subjected to fluid pressure, a groove 41 being provided in the piston stem, so as to permit the fluid pressure to act on the full area of the piston 13, and thus the piston 13 is promptly shifted to its upper position.

In release position of the brake valve 1, the port 36 in the rotary valve 30 registers with the train pipe port 26, so that fluid under pressure is supplied to the train pipe to maintain the train pipe pressure at the standard pressure carried according to the adjustment of the reducing valve 6. In this position, the cavity 32 also registers with the straight air port 27, so that the straight air pipe 25 is connected to the exhaust. In automatic service position the small ports 34 register with the train pipe port 26 so as to vent fluid from the train pipe to effect a reduction in train pipe pressure.

If it is desired to operate the brakes with straight air, the cock 38 is placed in the position opening communication through the straight air pipe 25 to the brake valve and by turning the brake valve to straight air application position, in which the through ports 35 register with the straight air port 27, air is supplied to the straight air pipe 25 and flowing to the movable abutment 21 shifts the same and opens communication around the abutment through grooves 42 to the passage 19, so that fluid under pressure flows through the passage 19 to the piston chamber 12 and thence to the brake cylinder pipe 18. The downward movement of the piston 21 also actuates the valve 22 to open communication from the auxiliary reservoir pipe 23 to the passage 19, so that fluid under pressure is vented from the auxiliary reservoir. This is for the purpose of causing the triple valve to be shifted to release position in any case where the triple valve parts are not already in release position, thus insuring that the automatic pipe 17 will be connected to the triple valve exhaust and that the piston 13 will be maintained on its lower seat.

It will be evident that the brake cylinder pressure may be increased as desired by turning the brake valve to straight air application and back to straight air lap position.

The brakes are released by straight air by turning the brake valve to release position, in which the exhaust cavity 32 registers with the straight air port 27. Air then flows from the brake cylinder through the by-pass 39 to the straight air pipe 25 and thence to the atmosphere.

One of the important features of my invention will now be described. In a combined automatic and straight air brake of this character, the brake cylinder pressure may be increased by straight air operation to the full pressure carried in the system, and if under such condition, an emergency reduction in train pipe pressure occurs, it will be evident that the triple valve piston will be shifted to emergency position, but no air is vented from the auxiliary reservoir to the brake cylinder, as the brake cylinder is already charged to the full pressure. The consequence is that when it is desired to release the brakes, there is no excess pressure available to enable the train pipe pressure to be raised above the auxiliary reservoir pressure, and so the triple valve cannot be shifted to release position. With my improvement, however, by turning the brake valve to release position, the straight air pipe is connected to the exhaust and fluid from the brake cylinder is released through the by-pass 39 and the brake valve. Upon reduction in brake cylinder pressure to a certain degree in this manner, a point will be reached, at which the automatic pressure in the pipe 17 acting on piston 13 is sufficient to overcome the reduced brake cylinder pressure and the pressure of the spring 14 and thereupon the piston 13 is shifted to its upper position, cutting off the communication from the brake cylinder to the straight air pipe 25. Communication is now opened from the automatic pipe 17 to the brake cylinder and thus fluid from the auxiliary reservoir is vented to the brake cylinder. This reduces the auxiliary reservoir pressure, so that the higher train pipe pressure acting on the triple valve piston operates to shift the same to release position, thus permitting fluid from the brake cylinder to exhaust through the triple valve exhaust port. When the brake cylinder pressure has been reduced in this manner to a certain low point, the piston 13 will be again shifted to close the automatic pipe 17 as hereinbefore described, and the remaining fluid in the brake cylinder will be released through the straight air pipe 25.

In making an emergency application the brake valve is turned to emergency position, in which the cavity 32 registers with the train pipe port 26 so as to effect an emergency reduction in train pipe pressure and the through port 37 registers with the straight air port 27 so that straight air is supplied to the straight air pipe 25. While the triple valve goes to emergency position and supplies air to the automatic pipe 17, the air flowing through the straight air pipe 25 operates to maintain the piston 13 at its lower position, so that the brake cylinder is charged with fluid pressure from the straight air pipe up to the full pressure supplied through the reducing valve 6 from the main reservoir 4, and in this case the auxiliary reservoir pressure will remain bottled up. This will not prevent the release of the brakes, however, as the auxiliary reservoir pressure is reduced by the action of the piston 13 upon connecting the straight air pipe to the exhaust, as hereinbefore described.

It will now be seen that a straight air application can be made at any time regardless of the position of the triple valve, while the release of the brakes and the return of the triple valve to release position is assured even if the auxiliary reservoir pressure is at the full pressure of the system at the time of releasing the brakes.

Having now described my invention, what I claim as new and desire to secure by Letters Patent, is:—

1. In a combined automatic and straight air brake, the combination with a train pipe, auxiliary reservoir, triple valve, and brake cylinder, of an independent pipe for supplying air to the brake cylinder and a valve mechanism adapted in one position to establish communication from the triple valve supply pipe to the brake cylinder and in another position from said independent pipe to the brake cylinder and operating when the triple valve is in emergency application position with the triple valve supply pipe open to the auxiliary reservoir, only upon a predetermined substantial reduction in brake cylinder pressure by release through the independent pipe, to open communication from said supply pipe to the brake cylinder.

2. In a combined automatic and straight air brake, the combination with a train pipe, auxiliary reservoir, triple valve, and brake cylinder, of a straight air pipe for supplying fluid to the brake cylinder and a piston having differential heads for controlling the release from the brake cylinder, the larger head being subject to the pressure of the straight air pipe, the smaller head to the flow of fluid from the triple valve.

3. In a combined automatic and straight air brake, the combination with a train pipe, auxiliary reservoir, triple valve, and brake cylinder, of a straight air pipe for supplying fluid to the brake cylinder and a piston having differential heads for controlling the release from the brake cylinder, the larger head being subject to the pressure of the straight air pipe, the smaller head to the flow of fluid from the triple valve, and having the brake cylinder connected to the space intermediate the piston-heads.

4. In a combined automatic and straight air brake, the combination with a train pipe, auxiliary reservoir, triple valve, and brake cylinder, of an independent pipe for supplying air to the brake cylinder, a brake valve for controlling the pressures in the train pipe and said independent pipe, and a valve mechanism having a position for connecting the brake cylinder with the triple valve supply pipe and another position for connecting the brake cylinder with the independent pipe and adapted upon a predetermined reduction in brake cylinder pressure by releasing through the independent pipe to close the independent pipe communication to the brake cylinder and open communication from the triple valve supply pipe to the brake cylinder.

5. In a combined automatic and straight air brake, the combination with a train pipe, auxiliary reservoir, triple valve, and brake cylinder, of an independent pipe for supplying air to the brake cylinder and a valve mechanism comprising a piston having a reduced area thereof exposed to the pressure in the triple valve supply pipe in one position and operating upon a predetermined reduction in the pressure of fluid released from the brake cylinder through the independent pipe to close communication from the brake cylinder to the independent pipe and open communication from the triple valve supply pipe to the brake cylinder.

6. In a combined automatic and straight air brake, the combination with a train pipe, auxiliary reservoir, triple valve, and brake cylinder, of an independent pipe for supplying air to the brake cylinder and a piston subject on one side to the pressure of the independent pipe and on the other side on a portion of the area to the pressure in the triple valve supply pipe and on another portion of the area to the pressure in the brake cylinder when the piston is in one position.

7. In a fluid pressure brake, the combination with a triple valve and brake cylinder, of a straight air pipe and a piston valve device having a small piston head operated by the flow of fluid from the triple valve for opening communication to the brake cylinder and a large piston head operated by the flow of fluid in the straight air pipe for opening communication from the straight air pipe to the brake cylinder.

8. In a combined automatic and straight air brake, the combination with a train pipe, triple valve, auxiliary reservoir, and brake cylinder, of an independent pipe and means operated by the flow of air from the independent pipe to the brake cylinder for venting air directly from the auxiliary reservoir and independently of the triple valve to insure the movement of the triple valve to release position.

9. In a combined automatic and straight air brake, the combination with a train pipe, triple valve, auxiliary reservoir, and brake cylinder, of an independent pipe and a movable abutment operated by the flow of air from the independent pipe to the brake cylinder for venting fluid from the auxiliary reservoir independently of the position of the triple valve.

10. In a combined automatic and straight air brake, the combination with a train pipe, triple valve, auxiliary reservoir, and brake cylinder, of an independent pipe, a double check valve device having one position for connecting the triple valve supply pipe to the brake cylinder and another position for connecting the independent pipe to the brake cylinder, and means operated by pressure in the independent pipe for opening communication for venting fluid from the auxiliary reservoir.

11. In a combined automatic and straight air brake, the combination with a train pipe, triple valve, auxiliary reservoir, and brake cylinder, of an independent pipe, a double check valve device having one position for connecting the triple valve supply pipe to the brake cylinder and another position for connecting the independent pipe to the brake cylinder, and means operated by the flow of fluid from the independent pipe to the brake cylinder for venting fluid from the auxiliary reservoir to the brake cylinder to effect the movement of the triple valve to release position.

12. In a combined automatic and straight air brake, the combination with a train pipe and triple valve, of an independent pipe and a differential double check valve having one position for connecting the triple valve supply pipe to the brake cylinder and another position for connecting the independent pipe to the brake cylinder, said check valve having its smaller area exposed to the pressure in the triple valve supply pipe in the latter position.

13. In a fluid pressure brake, the combination with a triple valve and brake cylinder, of a straight air pipe and a piston valve device having a small piston head operated by the flow of fluid from the triple valve for opening communication to the brake cylinder and a large piston head operated by the flow of fluid in the straight air pipe for opening communication from the straight air pipe to the brake cylinder, the space intermediate the piston heads being connected to the brake cylinder.

14. In a combined automatic and straight air brake, the combination with a train pipe, triple valve, and brake cylinder, of means for supplying fluid under pressure directly to the brake cylinder and a valve mechanism adapted in releasing the brakes after a straight air application with the triple valve in emergency application position to first release fluid directly from the brake cylinder, then through the triple valve exhaust and finally directly.

In testimony whereof I have hereunto set my hand.

WALTER V. TURNER.

Witnesses:
A. M. CLEMENTS,
J. H. EICHER.